United States Patent
Sawahara et al.

(10) Patent No.: US 7,126,626 B2
(45) Date of Patent: Oct. 24, 2006

(54) MULTIFUNCTIONAL MOBILE ELECTRONIC DEVICE

(75) Inventors: Shingo Sawahara, Higashihiroshima (JP); Seiji Kurokawa, Higashihiroshima (JP); Hirokazu Machide, Onomichi (JP); Makoto Sasaki, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/791,851

(22) Filed: Mar. 4, 2004

(65) Prior Publication Data

US 2004/0174430 A1 Sep. 9, 2004

(30) Foreign Application Priority Data

Mar. 7, 2003 (JP) ............................. 2003-061124

(51) Int. Cl.
*H04M 11/00* (2006.01)

(52) U.S. Cl. ................................. 348/14.02; 455/556.1

(58) Field of Classification Search ............ 348/14.02, 348/552, 373, 375, 376; 455/556.1, 557; 379/110.01

See application file for complete search history.

(56) References Cited

U.S. PATENT DOCUMENTS

| | | | |
|---|---|---|---|
| 6,510,325 B1 | 1/2003 | Mack, II et al. | |
| 2002/0142810 A1 | 10/2002 | Kawasaki et al. | |
| 2003/0036365 A1 | 2/2003 | Kuroda | |
| 2004/0048633 A1* | 3/2004 | Sato et al. | ................ 455/556.1 |
| 2005/0085263 A1* | 4/2005 | Kim et al. | ................ 455/556.1 |

FOREIGN PATENT DOCUMENTS

| | | | |
|---|---|---|---|
| EP | 1 111 919 A2 | 6/2001 | |
| EP | 1408673 A2 | 4/2004 | |
| JP | 8-88841 A | 4/1996 | |
| JP | 08-331424 A | 12/1996 | |
| JP | 10-257460 A | 9/1998 | |
| JP | 10304293 A | * 11/1998 | |
| JP | 10-336498 A | 12/1998 | |
| JP | 11-069214 A | 3/1999 | |
| JP | 2001-169166 A | 6/2001 | |
| JP | 2001-186396 A | 7/2001 | |
| JP | 2001-238111 A | 8/2001 | |
| JP | 2001-251544 A | 9/2001 | |
| JP | 2002-176577 A | 6/2002 | |
| JP | 2002-204296 A | 7/2002 | |
| JP | 2002-300237 A | 10/2002 | |
| JP | 2002-300550 A | 10/2002 | |

(Continued)

OTHER PUBLICATIONS

Machine translation for JP 2003-298884 A (Kitamura et al).*

(Continued)

*Primary Examiner*—Stella Woo
(74) *Attorney, Agent, or Firm*—Birch, Stewart, Kolasch & Birch, LLP (57) ABSTRACT

The main body section and the cover section, those of which are combined with the coupling section so that the electronic device can pivot, constitute the present invention. There is an input key section is provided in the opposed surface of the main body section meeting the cover section when the device is folded. There is the main display section provided in the opposing surface of the cover section meeting the main body section when the device is folded. Because of this, the electronic device can be used easier as a mobile phone. Furthermore, the electronic device also can be used easier as a still camera because the device can be used as a still camera immediately whenever the user wants to, even when the electronic device is in stand-by mode of mobile phone mode.

63 Claims, 7 Drawing Sheets

FOREIGN PATENT DOCUMENTS

| | | | |
|---|---|---|---|
| JP | 2002-354317 | A | 12/2002 |
| JP | 2003-169116 | A | 6/2003 |
| JP | 2003-304308 | A | 10/2003 |
| JP | 2003298884 | A * | 10/2003 |

OTHER PUBLICATIONS

"NTT DOCOMO Unveils "I-Shot" Service for New Camera-Equipped Mobile Phone Model"; NTT DOCOMO Press Release, May 28, 2002; XP002282953, Tokyo.

* cited by examiner

MULTIFUNCTIONAL MOBILE ELECTRONIC DEVICE

This Nonprovisional application claims priority under 35 U.S.C. § 119(a) on patent application No. 2003/061124 filed in Japan on Mar. 7, 2003, the entire contents of which are hereby incorporated by reference.

FIELD OF THE INVENTION

The present invention relates to a multifunctional mobile electronic device having (a) a digital camera function, and (b) an electronic device function that is carried out by an inputting section via which at least numeric data can be inputted and by a main display which displays an inputted content. More particularly, the present invention relates to a multifunctional mobile device including (i) a camera, having at least CCD, which converts a picture image into electric signals, and (ii) a display section composed of such as a liquid crystal display which can display picture image signals from the camera, externally inputted image signals, or other image signals, preferably with a PDA function such as a scheduler function.

BACKGROUND OF THE INVENTION

Recently, a digital camera using such as a CCD has become smaller and its performance has been highly improved. On this account, a mobile phone equipped with a digital camera has been prevailed. By using the mobile phone equipped with a digital camera, a picture image taken by the camera can be sent to a called party via phone line. Also the mobile phone can be used as a videophone by which the calling party and the called party can see each other's face on a display of each phone while chatting. Furthermore, the mobile phone can be used as a digital still camera by storing picture images in its memory.

This kind of conventional mobile phone is disclosed in Japanese Unexamined Patent Publication No. 10-257460 (published on Sep. 25, 1998), for example.

Figure 10:
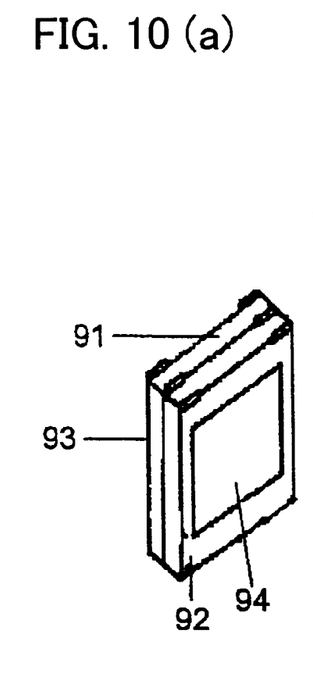

FIG. 10 shows the conventional mobile phone. Here, FIG. 10(a) is an external view illustrating the mobile phone when the mobile phone is used as a still camera. FIG. 10(b) is an external view illustrating the mobile phone when the mobile phone is used as a mobile phone or a mobile videophone (hereinafter referred to as mobile phone). FIG. 10(c) is an external view of the mobile phone when the mobile phone is folded.

In FIG. 10, a reference numeral 91 is a cabinet of the camera section. A camera lens 93 is placed on a surface of the camera device. A reference numeral 92 is a cabinet of the display section. When the mobile phone is used as a mobile phone, as shown in FIG. 10(b), a display section 94 composed of members such as a liquid crystal panel is placed on the side where the camera lens 93 is placed. The cabinet of the camera section 91 is combined with the cabinet of the display section 92 by the bond axes 90 so that the mobile phone can freely pivot. When the mobile phone is folded so that the camera lens 93 faces the display device 94, the mobile phone is in a foldaway state as shown in FIG. 10(c). On the other hand, when the mobile phone is folded conversely, the mobile phone is in a still camera mode as shown in FIG. 10(c).

Figure 11:
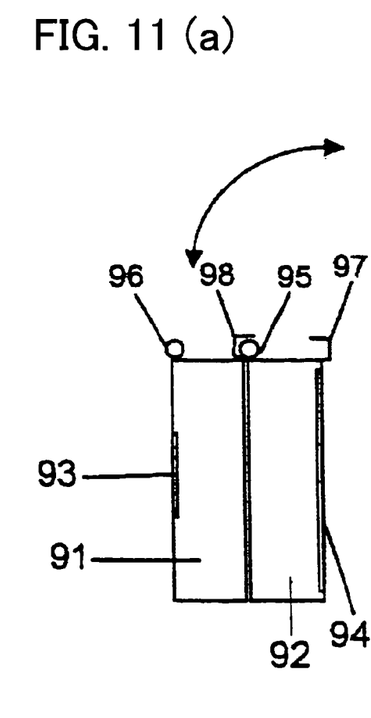

FIG. 11 shows details of the bond axes 90. As shown in FIG. 11, the cabinet of the camera section 91 includes cylindrical bond axes (95, 96), and the cabinet of the display section 92 includes semi-cylindrical bond axis bearings (97, 98). The bond axes (95, 96) and the bond axes bearings (97, 98) are provided so as to be incorporable in each other.

Here, as shown in FIG. 11(a), the mobile phone is used as a still camera when the bond axis 95 is combined with the bond axis bearing 98. On the other hand, FIG. 11(b) shows that the mobile phone is used as a mobile phone when the bond axis 96 is combined with the bond axis bearing 97 and when the bond axis 95 is incorporated in the bond axis bearing 98. Furthermore, FIG. 11(c) shows that the mobile phone is folded away when the cylindrical bond axis 96 is incorporated in the semi-cylindrical bond axis bearing 97.

It is not clearly indicated in the figures, but a signal-processing section for the camera section is contained in the cabinet of the camera section 91, and a signal-processing section for the display section is contained in the cabinet of the display section 92. In addition, a variety of signal processing sections for communication and a power source section are properly contained in the above-mentioned cabinets. Power supply means and signal transmission means are provided between the cabinet of the camera section 91 and the cabinet of the display section 92.

In this conventional technology, when the mobile phone is used as a mobile phone or a mobile videophone, the cabinet of the camera device 91 and the cabinet of the display device 92 are pivoted in a lengthwise direction, i.e., so that the camera lens 93 and the display device 94 are aligned in a single surface. On the other hand, when the mobile phone is used as a still camera, the mobile phone is folded so that both the display section 94 and the camera lens 93 face outside.

Note that it is not clearly indicated, but there is no need to say that properly equipped microphone and speaker are used when the mobile phone is used as a mobile phone or a mobile videophone. Note also that when the mobile phone is used as a mobile phone or mobile videophone, a dial indicating is carried out on the display section 92. This display section 92 is to be used as a touch panel, so as to operate a dial control.

According to the conventional technology mentioned above, a small mobile device having (a) a mobile phone function or a mobile videophone function and (b) a digital still camera function can be remarkably compacted. This is because the mobile phone is designed to be folded so that the camera section meets the display section.

However, dial buttons displayed and partially occupied on some parts of the display section 94 are used to input a telephone number in order to make a phone call. On this account, it is not only difficult to recognize the inputted content but also it is required to use a thin pencil-shaped indicator to operate a dial control. Therefore, the operation is not necessarily easy.

Furthermore, the display section 94 is easily scratched. This is because the display section 94, which becomes an input section when the mobile phone is used as a mobile phone, is always exposed to outside when the mobile phone is used as a digital still camera. Also, a keyboard of key switch type cannot be equipped on the display section.

In addition, the cabinet of the display section 92 and the cabinet of the camera section 91 can pivot in the range of 360 degree (in other word, one of the display device 92 and the cabinet of the camera device 91 can pivot with respect to the other in the range of 360 degree). This causes structure of this pivoting part to become complicated. Therefore, there are problems about the cost and the reliability of the product as well.

Also, in this conventional art, when the folded mobile phone is rung, it is required to unfold the mobile phone to see the display section. Without the unfolding, the called party cannot know who called. This raises a problem about usability.

In addition, when the mobile phone is used as a digital still camera, it is required to carry out a 360°-pivot with respect to the cabinet of the display section 92 and the cabinet of the camera section 91. This is bothering and takes time to release the shutter. This is another problem.

On the other hand, there is also a conventional camera-equipped mobile phone having a sub display section on which a picture image that has been picturized by the camera is displayed, the sub display section being provided on a plane in which a cover member to which the camera is attached is provided. Even though the user can take a picture of himself or herself easily with this mobile phone, it is difficult to take a picture of other subjects. Therefore it is difficult for this mobile phone to be used as a still camera. Furthermore, a prescribed procedure is required for changing to a camera mod from a mobile phone mode in the middle of using the mobile phone in the mobile phone mode. This is because the camera-equipped mobile phone is usually used as a mobile phone. Therefore there is a problem that it takes too much time to take a picture when the user wants to take a picture immediately.

SUMMARY OF THE INVENTION

The present invention is made in light of the foregoing problems. An object of the present invention is to provide a multifunctional mobile electronic device which can be easily operated when used as a digital still camera, and to which a keystroke operation can be carried out with ease when used as a different electronic device. Specifically, an object of the present invention is to provide a multifunctional mobile electronic device, i.e., a full-fledged still camera that also can be used as a mobile phone.

A multifunctional electronic device in accordance with the present invention is made in order to achieve the objects. The multifunctional mobile electronic device includes a device main body that is combined by a main body section and a cover section via a coupling section such that the main body and the cover section can be folded. One of inner surfaces (surfaces of the main body section and the cover body meeting each other when the electronic device is folded) of the main body section and the cover section is provided with an input key section including numeral keys, and the other of the inner surfaces is provided with a main display section. The multifunctional electronic device further includes (i) a lens, provided for a first camera, provided in one of outer surfaces (surfaces of the main body and the cover body which are exposed to outside when the electronic device is folded) of the main body section and the cover section, (ii) a sub display section, that serves as a finder of the first camera, provided in the other of the outer surfaces, (iii) a shutter button, provided for the first camera, provided in a side surface part of the device main body.

In the arrangement, it may be arranged such that the lens section for the camera and the sub display section are provided contrary to the above-mentioned arrangement, i.e., the lens section for the camera is provided in the outer surface of the cover section and the sub display section is provided in the main body section.

With the arrangement, the multifunctional electronic device can be used as a still camera while the multifunctional electronic device is folded. Furthermore, the multifunctional electronic device can be used as an electronic device having an easily operated key switch keyboard and the main display section such as a telephone terminal, when opening the cover section.

Accordingly, a multifunctional mobile electronic device that can be easily used as a still camera and that also works effectively as an electronic device such as a telephone is obtained. Especially, because the input section and the display section are separately provided in the cover section and the main body section, both the input section and the display section can be bigger.

Also, there is an advantage that designing machine becomes easier when the camera is provided in the main body section because a control circuit for the mobile phone terminal and a control circuit for the still camera can be provided all together in the main body section.

Also, in order to achieve the object, an electronic device in which first and second members can be folded via a coupling section, is characterized in that (a) the first member includes a lens section for a main camera provided in a surface on an opposite side of an opposed surface which faces the second member when the electronic device is folded, and (b) the second member includes a sub display section, that displays at least an image taken by the lens section, provided in a surface on an opposite side of an opposed surface which faces the first member when the electronic device is folded.

For a fuller understanding of the nature and advantages of the invention, reference should be made to the ensuing detailed description taken in conjunction with the accompanying drawings.

BRIEF DESCRIPTION OF THE DRAWINGS

FIG. 1(*a*) is a perspective illustration showing a state in which a cover is partially unfold in a multifunctional electronic device in accordance with an embodiment of the present invention, and FIG. 1(*b*) is a perspective illustration showing a state in which the cover of the multifunctional electronic device is completely unfolded.

FIG. 2(*a*) is a perspective illustration of the multifunctional electronic device when viewing from different point from FIG. 1(*a*), and FIG. 2(*b*) shows the other side of the multifunctional electronic device shown in FIG. 1(*b*).

FIG. 10(*a*) is a perspective illustration showing that a conventional compact electronic device is folded so as to be used as a camera. FIG. 10(*b*) is a perspective illustration showing a case where the compact electronic device is used as a mobile phone. FIG. 10(c) is a perspective illustration of the compact electronic device when folded away.

FIG. 11(a), (b), (c) are lateral view illustrations which correspond respectively to the FIG. 10(a), (b), (c).

DESCRIPTION OF THE EMBODIMENTS

Figure 1:
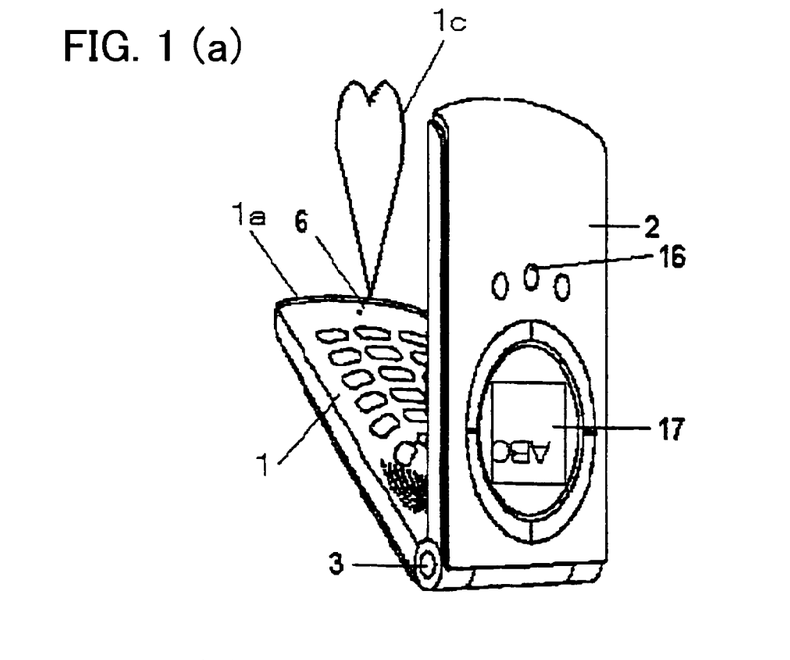
Figure 2:
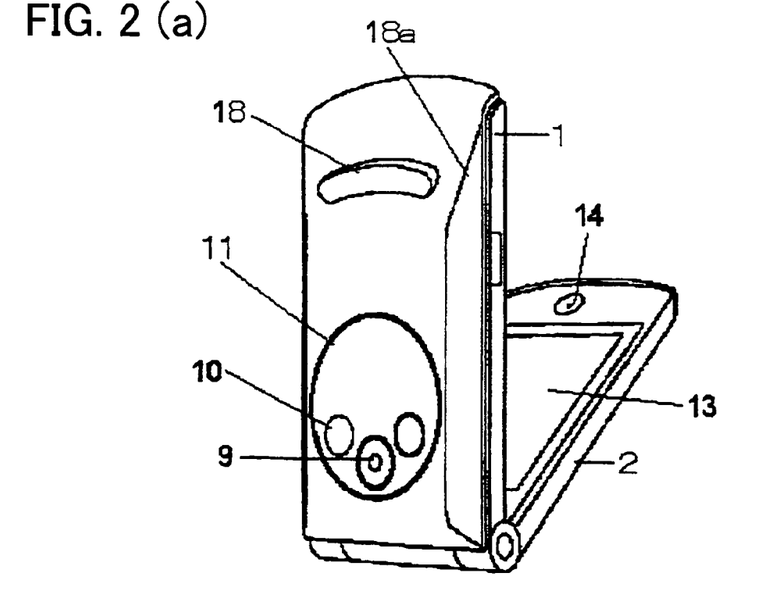

Thereinafter, a preferred embodiment of the present invention is explained in detail by using figures. FIG. 1 and FIG. 2 are overview illustrations of a multifunctional mobile electronic device in accordance with an embodiment of the present invention.

FIG. 1(a) shows that the electronic device main body is folded at the center. FIG. 1(b) shows that the electronic device main body is unfolded. FIG. 2(a) also shows that the electronic device main body is folded at the center, but FIG. 2(a) shows a case when the electronic device main body is viewed from the opposite side of FIG. 1(a). FIG. 2(b) shows that the electronic device main body is unfolded, but FIG. 2(b) shows a case when the electronic device main body is viewed from the opposite side of the FIG. 2(a).

The multifunctional mobile electronic device has a mobile phone function and a camera function, and can be used as a mobile phone terminal, which can be brought with the user wherever he or she goes, and also can be used as a camera. Furthermore, the camera function allows a picture image to be taken, and the mobile telephone function allows the picture image thus taken to be transmitted. In addition, the electronic device can also be used as a videophone terminal.

See FIG. 1 and FIG. 2. A reference numeral 1 indicates a rectangle-shaped main body section of the device (first or second member), the main body section 1 being illustrated so as to be longer than is wide in FIG. 1 and FIG. 2. The main body section 1 includes a variety of control circuits and other circuits which carry out the mobile phone function, and further includes a variety of key switches used for operations (later described in detail). A reference numeral 2 indicates a cover section (second or first member), and has substantially the same shape as that of the main body section 1. The cover section 2 is combined with the main body section 1 via a coupling section 3 so that the sections 1 and 2 pivot around the coupling section 3, thereby constituting the electronic device main body. The coupling section 3 is preferably a hinge structure which allows the main body section 1 and the cover section 2 to be folded or unfolded or retained at any angle. The electronic device main body can be unfolded up to approximately 180 degree.

Then, the main body section 1 and the cover section 2 constitute the multifunctional electronic device main body.

The main body 1 and the cover section 2 have arc-shaped ends on the opposite side of the coupling section 3, respectively. The arc-shaped ends realize a lock structure (not shown). The lock structure locks the arc-shaped ends when the main body section 1 meets the cover section 2.

A suspensible string 1b, which is used to suspend the multifunctional electronic device from one's neck and also can be used as a mobile phone strap, is provided at the center of the arc-shaped end 1a of the main body section 1. Therefore, when the multifunctional device is suspended from the user's neck, the device becomes a kind of ornament such as a pendant. Hence, the outer surfaces of the main body section 1 and the cover section 2 are designed and structured to be suitable for an ornament as later described.

On an inner surface of the main body 1, there are provided an inputting key switch section (operating section) 4 used to input numeral characters or alphabets, an operation key group 5 used for a variety of operations, a microphone 6 used for a voice input when the device is used as a mobile phone, and a speaker 7 used to amplify and reproduce a voice. Further, a sideway-position shutter button (first shutter button) 8 is provided on a side surface 52 of the main body section 1.

Furthermore, as shown in FIG. 2(a), there are provided a lens section (first image pick-up section) 9 for a main camera (first camera), a flashlight 10, and a rotary lens cover 11 which protects the lens section 9, provided for the main camera, at the external surface of the main body. In addition, in the present embodiment, the main key 51 (first or second shutter button), which is one of the operation key group 5, is designed to perform as a shutter button for the camera.

The lens cover 11 is constituted by a substantially circle-shaped thin metal sheet as shown in the figure, and the surface is embedded so as to be in plane with the surface of the main body section 1. In addition, the lens cover 11 is provided so as to rotate around its center part. A circle-shaped hollow section 12, used to put the user's finger on it, is provided on the lens cover 11 as shown in the FIG. 2(b). This structure allows the user to put his or her finger on the circle-shaped hollow section 12, so as to rotate the lens cover 11 with his or her finger.

On the lens cover 11, an opening is provided in an area corresponding to the area where the lens section 9 of the main camera is placed, and an opening is provided on the lens cover 11 in front of the flashlight 10. When the multifunctional electronic device is used as a camera, the lens cover 11 is rotated so that the openings correspond to the main camera lens section 9 and flashlight 10, respectively. Besides, by rotating the lens cover 11 up to a predetermined position, it is possible to cover the main camera lens section 9 and the flashlight 10, respectively, when the multifunctional electronic device is not used as a camera.

Note that the rotation of the lens cover 11 may be controlled as follows. Namely, the multifunctional electronic device may include a detecting means for detecting that the opening of the lens cover 11 is in a position at which the main camera lens section 9 is exposed, so as to carry out the digital still camera mode in response to the detecting means.

A reference numeral 18 indicates a grip, which makes grasping the multifunctional electronic device easier. When providing the main camera lens section 9 in an area corresponding to the coupling section 3, it is possible to contain the main camera in the coupling section 3.

On the inner surface side, the cover section 2 includes a main display (second display) 13, an earphone speaker 14, and a sub camera lens section (second image pick-up) 15. The main display 13 displays received e-mails, attached picture images and motion pictures when used as a videophone, or a variety of information for the mobile phone operation. The earphone speaker 14 is used when the multifunctional electronic device is used as a mobile phone, and the sub camera lens section (second image pick-up) 15 is used as a another camera when the multifunctional electronic device is used as a portable videophone terminal.

In this example, the sub camera lens section 15 is provided in the cover section 2 close to the coupling section 3, but the present invention is not limited to this, i.e., for example, the sub camera lens section 15 may be provided on the inner surface side of the main body section 1 if no space limitations.

There is provided another display section on the outer surface of the covering body 2. A rectangle-shaped sub display (first display) 17 is provided in a flat area of a frustum-shaped somewhat protuberant section on the outer surface side of the cover section 2 close to the coupling section 3. Furthermore, below the sub display section 17, three buttons 16 are provided along the skirt of the protuberant section. The three buttons 16 are used for operations dealing with information about e-mail of the mobile phone. Note that the three buttons (first shutter button or shutter button for second camera) 16 are also used as a further shutter button. To be specific, the shutter buttons 16 are used when the camera is operated at the lengthways-position.

Note that the position of the shutter buttons 16 are not limited to the position indicated in the figure, provided that the shutter buttons 16 are close to the sub display section. This is because the user sees the sub display section while he or she is taking a picture image with the device. And other key switches (not shown) for a variety of operations are provided.

The area where the above-mentioned sub display section 17 displays may be smaller than the area where the main display 13 displays. It is needless to say that the proper size depends on what is to be displayed. For example, in the stand-by mode in which the multifunctional mobile electronic device of the present invention is folded so as to be used as a mobile phone terminal, the sub display section 17 is used to display a calling party's phone number or a calling party's name if the name is stored in a memory.

Also, the sub display section 17 is used as an electronic finder when the main camera of this electronic device is used as a digital still camera. Furthermore, it goes without saying that a variety of information that the user intends to display can be displayed on the sub display section 17.

The main display section 13 is designed so that inputted texts are recognized properly and correctly on the display when the multifunctional electronic device is held by the user such that the inputting key switch section 4 is located downward as shown in FIG. 1(*b*). The sub display section 17 is designed such that the coupling section 3 is located above displayed texts that are recognized properly and correctly on the display.

The above-mentioned main camera functioned as the first camera has preferably two-mega pixels or more, so as to use the multifunctional electronic device as a full-fledged camera. On the other hand, around three hundred kilo pixels are enough for the sub camera as the second camera. This is because the sub camera is used for an image pick-up when the multifunctional electronic device of the present invention is used as a mobile phone terminal equipped with a digital camera or used as a mobile videophone terminal.

A memory is provided in the multifunctional electronic device of the present invention such that picture image information (image data) taken by a camera can be stored in the memory. When the image data is a facial portrait, for example, the image data is correlated with the identification information of the identical person of the facial portrait such as telephone number. Then, when receiving a call from the identical person having the telephone number, the image data stored in the memory is displayed by the sub display section. Note that the image data is not limited to a facial portrait, provided that the image data is information, including a facial portrait, which is correlated with a specific identification information.

Figure 3:
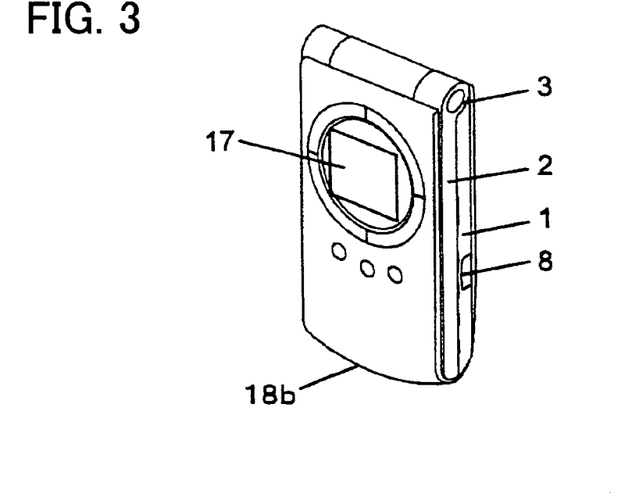
FIG. 3 is a perspective illustration showing a state in which the multifunctional electronic device of the present invention is folded.

FIG. 3 shows that this multifunctional electronic device is folded. As shown in FIG. 3, when the device is folded and held such that the coupling section 3 is located upward, the device has a lengthways shape. At that time, texts displayed in the sub display section 17 can be seen properly and correctly. And then, when the device is unfolded by pulling the cover section 2 upward, the main display section 13 comes out on the inner surface side of the cover section 2. And the texts are displayed in the main display section 13 such that the coupling section 3 is located under the texts that are displayed properly and correctly (see FIG. 1(*b*)). Because of this, the user can read texts displayed in the main display without turning the device around. Therefore the design of this device is highly user-friendly.

When this multifunctional electronic device is used as a mobile telephone terminal, as shown in FIG. 1(*b*), the microphone 6 is to be placed near one's mouse, and the speaker 14 is to be put near the user's ear, while the device is unfolded. By taking such an action, the user can use this multifunctional electronic device as comfortable as when he or she uses a conventional mobile phone terminal. Note that the side of the main body section 1 for the coupling 3 meets the side of the cover section 2 for the coupling 3 when the device is unfolded at its maximum as shown in FIG. 1(*b*).

This multifunctional electronic device is not only used as a mobile phone terminal, but also can be used seamlessly as a camera and as a videophone.

The following description deals with (a) how this multifunctional electronic device is used as a camera with reference to FIG. 4, FIG. 5, FIG. 6, and FIG. 7 and (b) how this multifunctional electronic device is used as a videophone.

Figure 4:
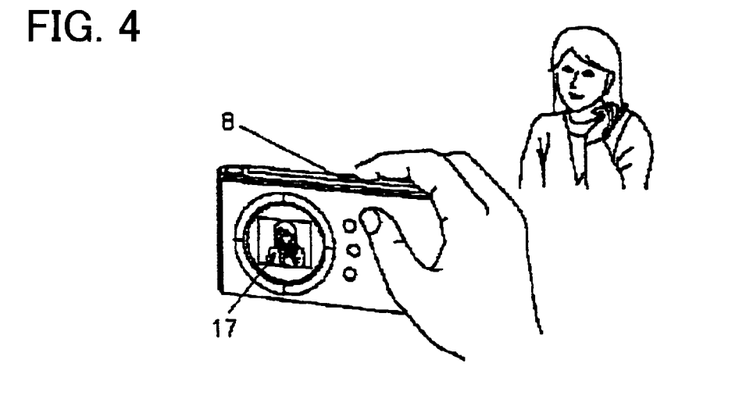
FIG. 4 is an explanatory view showing a case where the multifunctional electronic device of the present invention is used as a full-fledged camera.

FIG. 4 shows how this multifunctional electronic device is used as a still camera. In FIG. 4, the device is folded and held in a sideways manner by holding an arc-shaped edge 18*b*. The main camera lens 9, which is not shown in FIG. 4, is pointed at a subject, and the sub display 17 on the cover section 2 is used as an electronic finder.

Furthermore, a taper 18*a* is formed toward the arc-shaped edge 18*b* of the outer surface of the main body section 1. When the user puts his or her fingers along the taper 18*a* and then holds the device by grasping the grip 18 that is projected on the taper 18*a*, the user can hold the device in a sideways manner. Thereafter, when pushing the sideway-position shutter button 8, a picture image can be taken. In addition, because the main body section 1 is combined with the cover section 2, the camera itself is firmly stable. Also picture images can be taken with less camera shake because this tight camera can be held firmly. Although this is not specially shown in the figure, the camera can be held more stably by putting the user's left hand on the bottom of the device.

It is preferable that the device starts to perform the camera function as soon as a shutter button of the device is touched, when the multifunctional electronic device is switched on, folded, and in stand-by mode as a mobile phone. This greatly increases the user-friendliness because a picture can be taken even when the user intends to take a photo in an instant. This is realized by the following arrangement. For example, when the user presses the shutter button 8 and the device detects that the shutter button 8 is pressed, (a) the device changes the mobile phone mode to the still camera mode, and (b) a picture is taken under the conditions at the time and its image information is stored.

Figure 5:
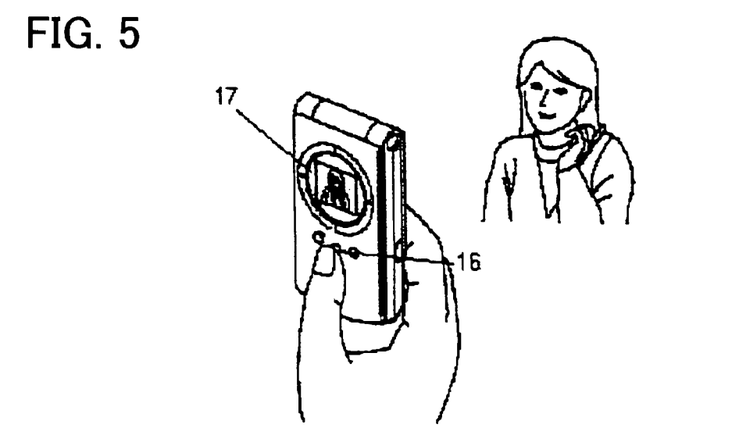
FIG. 5 is an explanatory view showing a case where the multifunctional electronic device of the present invention is used as a lengthways-position camera.

FIG. 5 shows how the device is used as a camera in a lengthwise manner. In this case, when using the shutter button 16 that are provided under the sub display section 17, it is possible to stably take a picture while the camera (multifunctional electronic device) is held with one hand.

Figure 6:
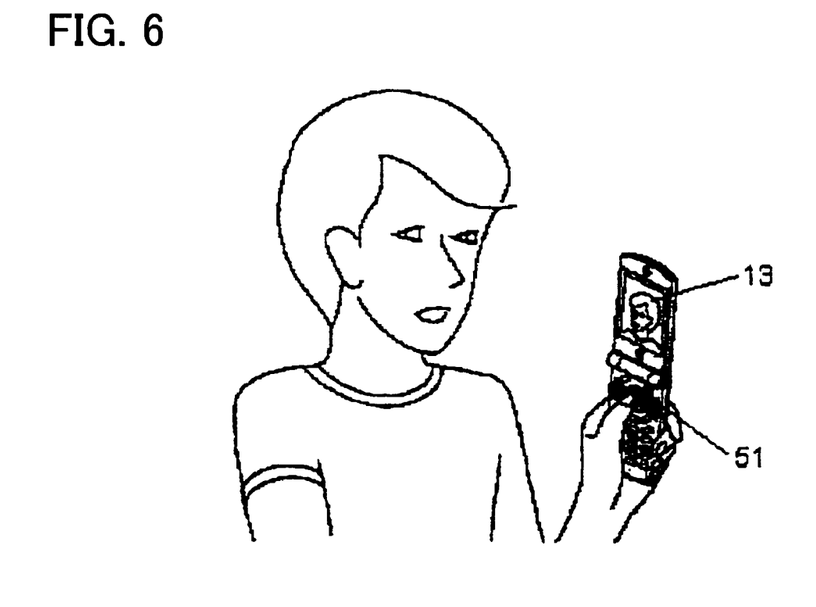
FIG. 6 is an explanatory view showing how the multifunctional electronic device of the present invention is used when the user takes a picture of himself or herself.

FIG. 6 shows how the user takes a picture of himself or herself. In this case, the sub camera lens section 15 provided under the main display section 13 is used. The main display section 13 is used as an electronic finder, and the key 51 of the operation key group 5 is used as a shutter button.

Figure 7:
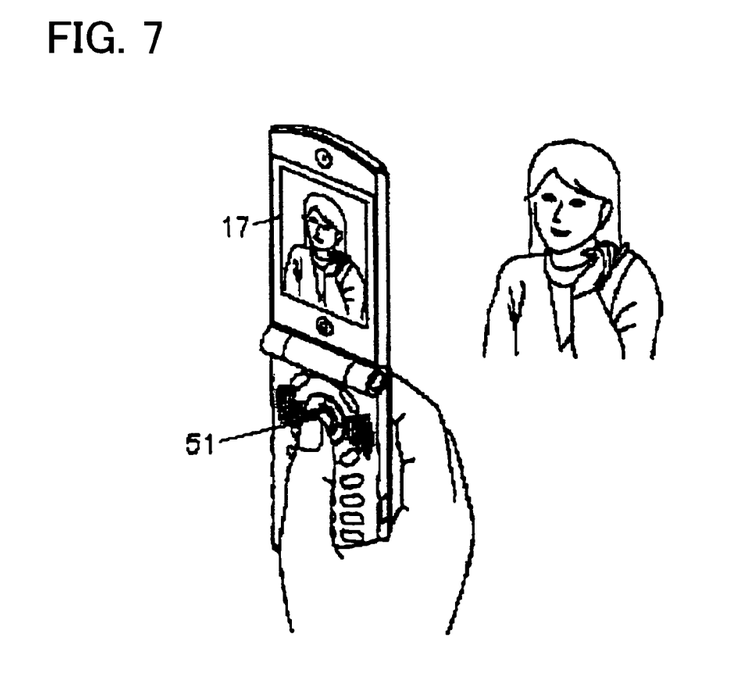
FIG. 7 is an explanatory view showing how the multifunctional electronic device of the present invention is used differently, and shows how the user takes a picture of a subject with the multifunctional electronic device unfolded.

In this case, there is no need to say that the multifunctional electronic device may be arranged such that the main camera is used and its lens section 9 is selected so as to take a picture of a subject. FIG. 7 shows an example.

When this multifunctional electronic device is used as a videophone terminal, the lens section 15 for the sub camera is used to take an image. The image thus taken is sent to a receiving end, and an image transmitted from the receiving end is displayed on the main display section 13. In this case, the lens section 15 for the sub camera is provided near the coupling section 3. This allows the lens section 15 for the sub camera to be located close to an eye line of the user watching the main display section 13. Therefore, the user is taken a picture from an optimum angle by the sub camera.

In the meantime, a speaker 7 amplifies the voice of the receiving end, and a microphone 6 captures the voice of the user and transmits the voice to the receiving end. In this case, the device may be arranged such that a part of the main display section 13 displays an image which is sent to the receiving end and the user can communicate while monitoring the image on the main display section 13.

In the meantime, it is possible for the user to use a composite image and transmit it to a receiving end. The composite image is made by combining first and second images. The first image is obtained by unfolding the electronic device as shown in FIG. 1(b) and FIG. 2(b), by holding it in such a sideway manner as to allow the user's right hand to hold it on the side of the arc-shaped edge 18b in the main body section, and by using the device as the sub camera and taking a picture of the user's own. The second image is obtained by taking a picture of an image such as beautiful scenery with the use of the main camera. The second image is incorporated into the first image. The second image serves as background of the first image. The image thus combined may be displayed on a part of the main display section 13.

The above-mentioned example deals with a case where the lens section 9 for the main camera is provided on the outer surface of the main body section 1 and the sub display section 17 is provided on the outer surface of the cover section 2. However, the present invention is not limited to this. i.e., it may be arranged such that the sub display section 17 is provided on the outer surface of the main body section 1 and the lens section 9 for the main camera is provided on the outer surface of the cover section 2. This arrangement allows the multifunctional electronic device to be a full-fledged still camera.

In this arrangement, it is also possible to obtain a composite image similar to the foregoing arrangement. Namely, the composite image is made by combining first and second images. The first image is obtained by unfolding the electronic device with a greater angle than that shown in FIG. 1(a) (for example, by unfolding it with about 90 degree), by holding it in such a vertical manner as to allow the user's right hand to hold it or as to allow the electronic device to be put on a desk, and by taking a picture of the user's own with the lens section 15 for the sub camera. The second image is obtained by taking a picture of an image such as beautiful scenery with the use of the lens section 9 for the main camera which is provided on the outer surface of the cover section 2.

The description deals with a case where the main camera is used as a full-fledged still camera, but the present invention is not limited to this. There is no need to say that a picture image taken by the main camera can be sent to a receiving end by using the mobile phone function. In this example, the size of picture image becomes big, so it is preferable to provide in a camera control circuit some means for changing the picture image size into a proper size for sending via the mobile phone function.

Figure 8:
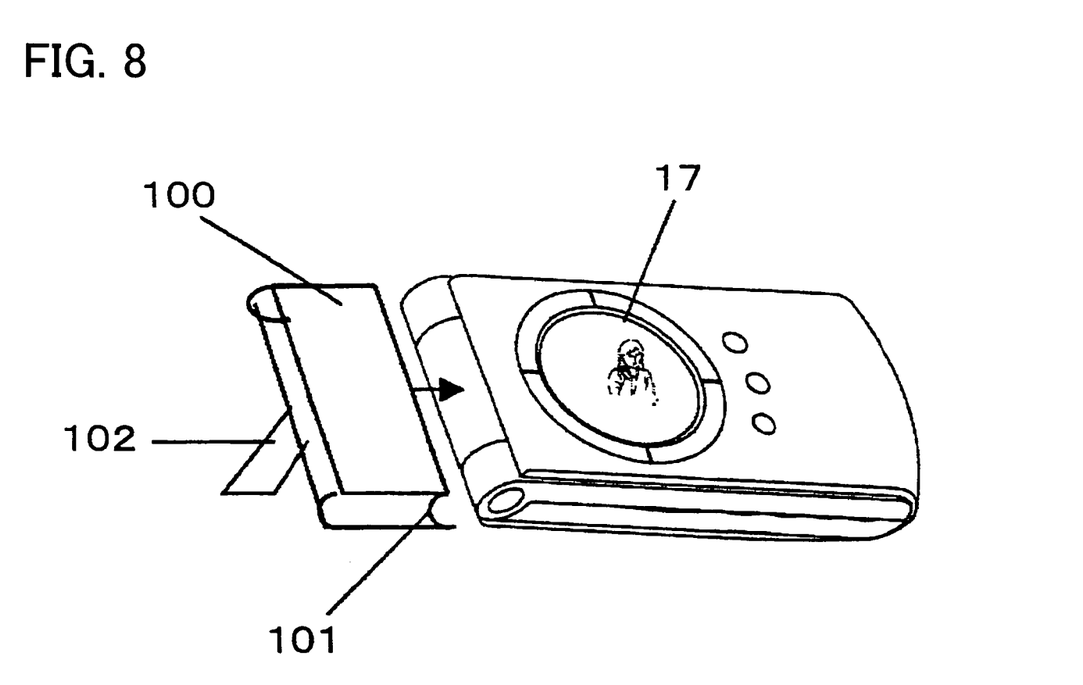
FIG. 8 is an explanatory view showing how the multifunctional electronic device of the present invention is used.

FIG. 8 is a perspective view showing how the multifunctional electronic device is charged. As shown in the figure, a reference numeral 100 is a rectangle-shaped adapter, which can be fitted into and can be removed from a peripheral part of the coupling section 3 of the device via a concave-shaped fitting part 101. Note that the fitting between the two parts becomes firmer when the coupling section 3 and the adapter 100 are magnetically connected.

An adapter stand 102 is provided at the bottom of this adapter 100, which enables the adapter 100 to stand at a proper angle of 135 degree, for example. And in this example, the adapter stand works as a photo stand; the electronic device fitted into the adapter 100 also stands and sustains at the same angle as the adapter 100 stands. Because the sub display section 17 can be seen from the front in this state, the device becomes a photo stand that displays a stand-by picture image when the device is in a mobile phone mode.

When this multifunctional electronic device is used as a mobile phone, the multifunctional electronic device is used in a lengthways (vertical) manner. Therefore, a received picture image or a taken picture is displayed so that top or bottom of the picture is directed to the coupling section 3 and the arc-shaped edge. In contrast, when the electronic device is put in a sideways manner as mentioned above, a picture image on the sub display section 17 is rotated at an angle of 90 degree and displayed so that one of the longer sides of the picture image is directed to the top. A built-in positioning sensor (not shown), which detects whether the device is in a sideways manner or the device is in a lengthways manner, controls the direction of the picture image displayed in the sub display section 17.

In addition, in this case, three-dimensional information can be displayed on the sub display section 17 when a liquid crystal display apparatus, which can select and display two-dimensional information or three-dimensional information, is used for the sub display 17. In this example, the angle of the adapter stand 102 is adjusted such that the device main body is inclined at an angle which allows the user to view a stereo-image in the best condition.

Figure 9:
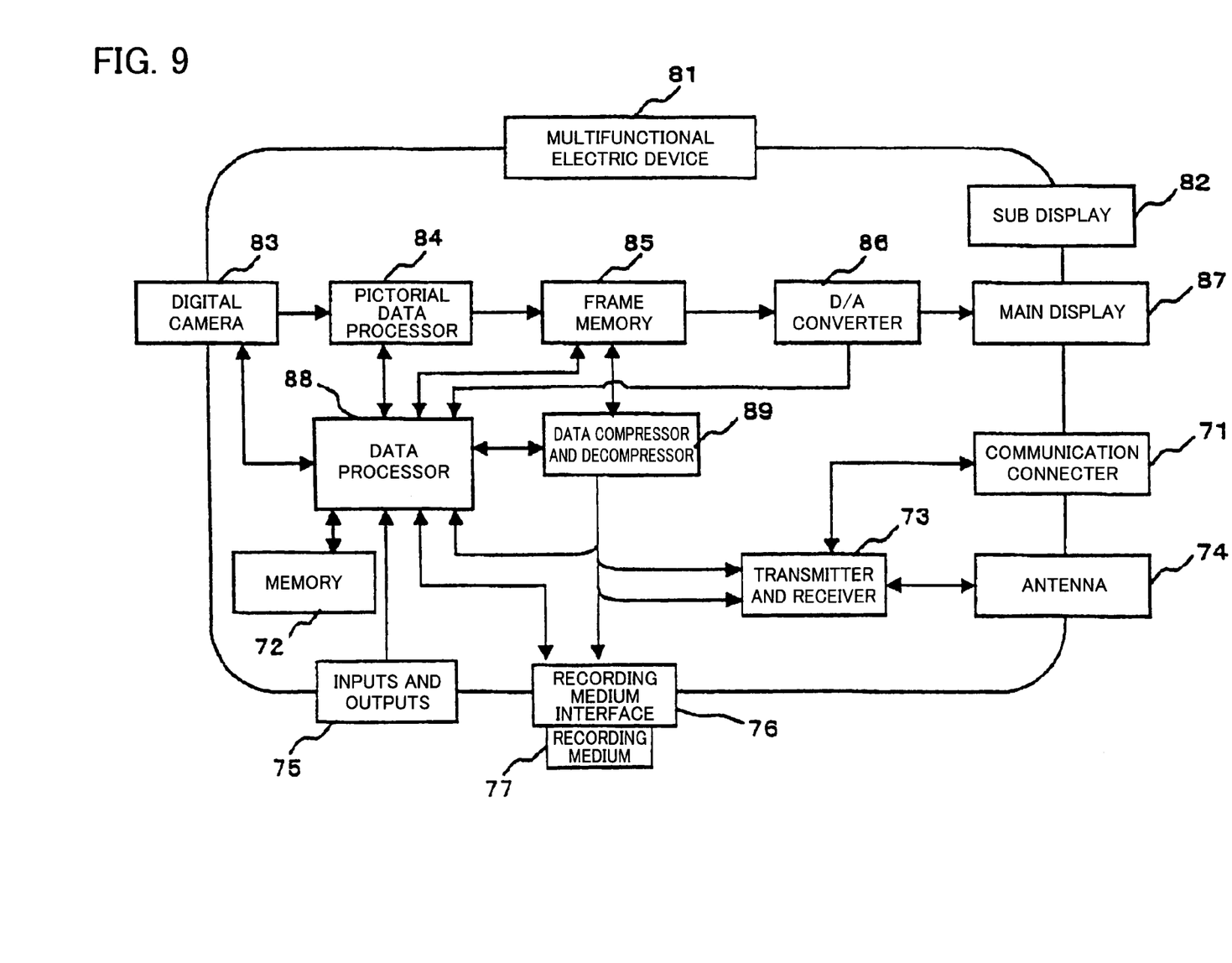
FIG. 9 is a block diagram schematically showing a flow of a signal processing of the multifunctional electronic device.

FIG. 9 shows a schematic view showing the signal processing of the multifunctional electronic device of the present invention having both a mobile phone function and a digital camera function relating to the present invention. Because the signal processing is not essential matter for the present invention, the details are omitted here.

As shown in FIG. 9, a multifunctional electronic device 81 in accordance with the present invention having a mobile phone function and a digital camera function includes a data processor means 88 for entirely controlling operations of this multifunctional electronic device. A CPU is included in this data processor means 88. (a) An input-output means 75 such as a variety of key switch sections, a microphone for voice input and a speaker for voice output, and (b) a memory 72 are connected to the data processor means 88.

The memory 72 includes (i) a ROM in which an operation control program causing the multifunctional electronic device to function as a digital camera or as a mobile phone having a camera is stored, (ii) a ROM in which a variety of constants and parameters which indicate picture-taking conditions, respectively for the digital camera function, and (iii) a RAM (storage means) which is used as working area when a program is run.

The above-mentioned data processor means 88, the details about it being omitted, carries out overall control over the multifunctional electronic device 81 of the present invention such as (a) a sampling timing control of the image data taken by the digital camera or the mobile phone having a camera, (b) an exposure control including settings of aperture diaphragm and shutter speed, (c) a focusing control, (d) a zoom control, (e) a setting of white balance, (f) a control of image data log, (g) a communication control, (h) a display control, (i) a processing for converting the number of pixels of an image data, (j) a variety of conversion processing of added data, and (k) setting and releasing of mode for saving the power consumption.

The multifunctional electronic device 81 of the present invention further includes a main display section 87, a sub display section 82, a digital camera 83 including main and sub cameras, image data processor means 84, a frame memory 85 for temporarily storing image data, a D/A converter 86, data compressor and decompressor means 89, a recording medium interface 76, and a recording medium 77. The multifunctional electronic device 81 further includes transmission and receiving means 73 required for the mobile phone function, a communication connecter 71, and an antenna 74.

The image data processor means 84 carries out operations such as changing of the number of the pixels, a sharpness offset, gamma correction, a contrast correction, a white balance compensation. An image data outputted from the image data processor means 84 is temporarily stored in the frame memory.

The compressor and decompressor means 89 carries out a control of compressing of data such as image data in accordance with a technique such as JPEG or MPEG files, and carries out a control of decompressing of the compressed data by the command of the data compressor and decompressor means 89. This allows large volumetric data such as image data to send and receive efficiently. The data recording medium interface 76 is provided for connecting or disconnecting the recording medium 77 such as (a) a semiconductor such as a variety of memory cards or an MO, (b) a magnetic recorder, or (c) a magneto-optical recorder.

The transmission and receiving means 73 is commanded by the data processor means 88 to encode and complexate data such as image data and directories, to put the data on carrier wave, and to send and receive the data via the antenna 74.

The communication connecter 71 is provided for wired-line communication of information such as image data. Besides, the communication connector 71 can send image files or data stored in RAM or ROM in the memory 72 or the frame memory 85 to a device which includes a similar communication connector, and can save data transmitted from a receiving end in the variety of recording media. Note that an optical cable can be used for the connection between the communication connects. In this case, the signal should be converted into an optical signal.

Although it is not described in the figure, the main camera and the sub camera are arranged in parallel in the digital camera 83. The user can choose a suitable camera of the two for each occasion.

It is preferable to set up the multifunctional electronic device so that the main camera can operate immediately when the multifunctional electronic device of the present invention is folded and in the stand-by mode of the mobile phone. This allows the user to release the shutter immediately, when the sideway-position shutter button 8 is pressed.

Beside, a shutter button can be assigned to a variety of key switches. However, as explained in the embodiment, shutter buttons are assigned to the sideway-position shutter button 8, the lengthways-position shutter button 16, and the key 51 of the operation key group 5.

Besides, although the detail is omitted, the digital camera 83 includes (a) a photoelectric conversion device such as CCD which carries out photoelectric conversion by forming an image of the subject on a light receiving surface and which outputs the converted result as an image data, (b) focusing means for forming the image of the subject on the light receiving surface, (c) an aperture mechanism for adjustment of light exposure, (d) shutter speed adjuster means for adjustment of an exposure time, and (e) a zoom mechanism for adjustment of a field angle. All of the devices and means (a) through (e) are controlled by the data processor means 88. Also, when the multifunctional electronic device is used as a mobile phone terminal, voice input and voice output are carried out by the input-output means 75.

The embodiment deals with a multifunctional electronic device having both a still camera function and a mobile phone function, but the present invention is not limited to this. The multifunctional electronic device may be arranged so as to include a personal computer function, a calculator function, a PDA function, an e-mail function, or a translation function, instead of the mobile phone function. Alternatively, at least one of the functions may be included.

The present invention may be comfortably used as an ordinary multifunctional electronic device, such as a mobile phone, having displays section and inputting key switch section when the multifunctional electronic device is unfolded. The multifunctional electronic device may be also used as seamless as a full-fledged still camera when the multifunctional electronic device is folded. In this case, it is possible to take a picture with less camera blurring.

According to the present invention, it is possible in the sub display section to see information relating to the multifunctional electronic device, while the multifunctional electronic device is folded. Therefore, when information is obtained via communication—for example, when receiving a telephone call—the user can easily know who called by only seeing the sub display section. In this case, when information such as a face of a sending end was stored in a memory of the main body of the multifunctional electronic device, it is possible to display the information such as the face upon receipt of a telephone calling, thereby increasing further amusement during the use of the multifunctional electronic device.

According to the present invention, when holding the multifunctional mobile electronic device such that its coupling section directs upward while the multifunctional mobile electronic device is folded, it is possible to directly read texts from the sub display section. And, when the multifunctional mobile electronic device is kept to be held like that, it is possible to directly read texts from the main display section by unfolding the cover section upward, thereby ensuring that the user can comfortably use the multifunctional mobile electronic device.

When the multifunctional electronic device of the present invention is used as a videophone, it is possible for a sending end (a) to transmit its image to an receiving end while the sending end sees an image from the receiving end, and (b) to listen to the receiving end after amplifying a voice from the receiving end, thereby ensuring that the user can comfortably use the multifunctional mobile electronic device.

Further, according to the present invention, the multifunctional electronic device becomes more user-friendly because shutter buttons provided for the camera are provided in various areas. This allows the user to take a variety of pictures in accordance with how the camera is used, thereby improving the operationality of the multifunctional electronic device.

According to the present invention, it is possible to respectively display images taken by the main camera and the sub camera in the main display section.

As mentioned above, the multifunctional mobile electronic device relating to the present invention includes a device main body that is combined by a main body section and a cover section via a coupling section such that the main body and the cover section can be folded. One of inner surfaces (surfaces of the main body section and the cover body meet each other when the electronic device is folded) of the main body section and the cover section is provided with an input key section including numeral keys, the other of the inner surfaces is provided with a main display section. The multifunctional mobile electronic device further includes (i) a lens section, provided for a first camera, provided in one of outer surfaces (surfaces of the main body and the cover which are exposed to outside when the electronic device is folded) of the main body section and the cover section, (ii) a sub display section, that serves as a finder of the first camera, provided in the other of the outer surfaces, and (iii) a shutter button, provided for the first camera, provided in a side surface part of the device main body.

In the arrangement, it is preferable that the multifunctional mobile electronic device in accordance with the present invention is constituted so that the main display section displays information such that the coupling section is downward, and the sub display section displays information such that the coupling section is upward.

With the arrangement, it is possible to see the texts and/or the image displayed on a sub screen when holding the present multifunctional mobile electronic device such that the coupling section is upward while the cover section is folded. Further, when unfolding the cover section upward while keeping the above state, it is also possible to directly see the texts and/or the image displayed on the main display section.

According to the present invention, it is possible to display, on the sub display section that serves as a finder, information of the electronic device such as a telephone terminal. This allows identification information of a sending end in an email to be displayed on the sub display section, even when the cover section is folded.

In the multifunctional mobile electronic device of the present invention, the device main body has a rectangular shape and a shutter button provided for a camera is provided. This allows the multifunctional mobile electronic device to be used as a full-fledged still camera when the device main body is hold in an oblong manner.

In the arrangement, it is preferable that a sub camera and a speaker are provided on an inner surface side of the electronic device main body which is kept to be unfolded.

With the arrangement, when the multifunctional mobile electronic device is used as a videophone, it is possible to transmit an image of a sending end that has been taken while viewing an image (face image) on the main display section that has been transmitted from a receiving end and it is also possible to listen to the receiving end.

In the arrangement, it is preferable that (a) a shutter button provided for the sub camera is provided on the inner surface side of the electronic device main body that is kept to be unfolded, and (b) the third shutter button is provided near the sub display section.

When the multifunctional mobile electronic device is used as a mobile phone, this arrangement allows the main camera to take a picture by using the main display section that serves as a finder of the main camera. Furthermore, when a shutter button provided for the main camera is provided in plane with the sub display section, it is possible to use the multifunctional mobile electronic device as a vertical still camera. Further, it is possible to use the main display section simultaneously in a various manner, for example, to use for superimposing of the image from the camera and the image from the sub camera.

In the arrangement, it is preferable that the sub display section displays identification information of a sending end that has transmitted a communication request, and the electronic device stores information such as an image related to the identification information, and display the related information on the sub display when the sending end corresponds to the identification information.

With the arrangement, it is possible to know who has called only by viewing the sub display section, thereby ensuring user-friendliness as a mobile phone.

Incidentally, the foregoing embodiment deals with the arrangement in which the sideways-position shutter 8 is provided in the side part 52 of the main body section 1, but the present invention is not limited to this. The sideways-position shutter 8 may be provided in a side part of the main body section other than the side part 52. Alternatively, the sideways-position shutter 8 may be provided in the cover section 2, instead of placing the sideway-position shutter 8 in the main body section 1.

The foregoing embodiment deals with the arrangement in which the cover section 2 is provided with the shutter button 16, but the present invention is not limited to this. The shutter button 16 may be provided in a surface where the lens section 9 in the main body section 1.

Furthermore, the foregoing embodiment deals with the arrangement in which the main body section 1 is provided with the shutter button 51 provided for the sub camera, the present invention is not limited to this. The shutter button 51 may be provided in an inner surface of the cover section 2, for example on a side of the lens section 15 for the sub camera.

Also, the foregoing embodiment deals with the arrangement in which the cover section 2 is provided with the shutter button 15 provided for the sub camera, but the present invention is not limited to this. The shutter button 15 may be provided in an inner surface of the main body section 1.

As described above, the electronic device relating to the present invention in which first and second members can be folded via a coupling section. The first member includes a first image pick-up section provided in a surface on an opposite side of an opposed surface which faces the second member when the electronic device is folded. The second member includes a first display section, which displays at least an image taken by the first image-pick up section, provided in a surface on an opposite side of an opposed surface which faces the first member when the electronic device is folded.

Also, it is preferable that the electronic device includes (ii) an operation section of key-switch type provided in an opposed surface of the first member or the second member, and (ii) a second display section which displays at least data supplied via the operation section in the other of the opposed surfaces.

Furthermore, it is preferable that the electronic device includes a first shutter button provided for the first image pick-up section provided in an outer surface of the electronic device when the electronic device is folded.

Also it is preferable that the electronic device includes the first shutter button (i) provided in a surface which is perpendicular to the opposed surface of the first member or (ii) provided in a surface which is perpendicular to the opposed surface of the second member.

Also it is preferable that the electronic device includes the first shutter button (i) provided in the surface on the opposite side of the opposed surface of the first member or (ii) provided in the surface on the opposite side of the opposed surface of the second member.

Also it is preferable that the electronic device includes a second image pick-up section provided in an opposed surface of the first or second member.

Also it is preferable that the electronic device includes a second image pick-up section provided in an opposed surface of the first or second members.

Also it is preferable that the electronic device has a communication function.

Also it is preferable that the electronic device has a mobile phone function.

The object of the detailed explanations of the embodiments and examples is only to clarify the contents of the technique of the present invention. Therefore, these detailed explanations should not be understood in the narrow sense restricting to the concrete examples. The present invention can be modified variously within the intentions of the invention and the claims.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A multifunctional mobile electronic device comprising:
a device main body that is a combination of a main body section and a cover section via a coupling section such that the main body section and the cover section can be folded,
one of inner surfaces of the main body section and the cover section meeting each other when the electronic device is folded, one of the inner surfaces being provided with an input key section including numeral keys, the other of the inner surfaces being provided with a first display section,
said device further comprising:
a lens section, provided for a first camera, provided in one of outer surfaces of the main body section and the cover section, the outer surface being exposed to outside when the electronic device is folded;
a second display section, that serves as a finder of the first camera, provided in the other of the outer surfaces; and
a shutter button, provided for the first camera, provided in a side surface part of the device main body,
information processing means, which allows the first camera to carry out image capturing when the main body section and the cover section are folded,
when the main body section and the cover section are folded, the second display section serving as the finder of the first camera by displaying an image of a target for the first camera,
the cover section including a second camera in its inner surface.

2. The multifunctional mobile electronic device as set forth in claim 1 wherein:
the device main body has a rectangular shape.

3. The multifunctional mobile electronic device as set forth in claim 2, wherein:
the shutter button, provided for the first camera, is provided in an oblong part of the device main body.

4. The multifunctional mobile electronic device as set forth in claim 3, wherein:
the second display section displays at least one part of information displayed in the first display section.

5. The multifunctional mobile electronic device as set forth in claim 2, wherein:
the second display section displays at least one part of information displayed in the first display section.

6. The multifunctional mobile electronic device as set forth in claim 1, wherein:
the second display section displays at least one part of information displayed in the first display section.

7. The multifunctional mobile electronic device as set forth in claim 1, wherein:
said device has a communication function.

8. The multifunctional mobile electronic device as set forth in claim 7, wherein:
said device has a mobile phone function.

9. The multifunctional mobile electronic device as set forth in claim 7, wherein:
the second display section displays at least identification information of a sending end that has transmitted a communication request, while the multifunctional mobile electronic device is folded.

10. The multifunctional mobile electronic device as set forth in claim 9, wherein:
the main body section includes a microphone in its inner surface; and
the cover section includes a speaker in its inner surface.

11. The multifunctional mobile electronic device as set forth in claim 9, further comprising:
a shutter button, provided for a second camera, provided around the second display section.

12. The multifunctional mobile electronic device as set forth in claim 1, wherein:
the first display section displays information such that the coupling section is downward, and the second display section displays information such that the coupling section is upward.

13. The multifunctional mobile electronic device as set forth in claim 1, wherein:
the main body section includes a shutter button, provided for the second camera, in its inner surface.

14. The multifunctional mobile electronic device as set forth in claim 1, wherein:
the first display section simultaneously displays images taken by the camera and the second camera, respectively.

15. The multifunctional electronic device as set forth in claim 1, wherein:
the second display section displays the image of the target in such a direction that a top of the image of the target corresponds to a top of the target.

16. The multifunctional electronic device as set forth in claim 1, wherein:
   while holding a connection made by using the multifunctional electronic device as a telephone terminal, the information processing means carries out control such that the second camera serves as a camera for carrying out the image capturing.

17. The multifunctional electronic device as set forth in claim 1, wherein:
   while holding a connection made by using the multifunctional electronic device as a telephone terminal, the information processing means is able to transmit, to a receiving end, an image captured by the second camera.

18. The multifunctional electronic device as set forth in claim 1, wherein:
   while holding a connection made by using the multifunctional electronic device as a telephone terminal, the information processing means carries out control such that the first camera serves as a camera for carrying out the image capturing.

19. The multifunctional electronic device as set forth in claim 1, wherein:
   while holding a connection made by using the multifunctional electronic device as a telephone terminal, the information processing means is able to transmit, to a receiving end, an image captured by the first camera.

20. The multifunctional electronic device as set forth in claim 1, wherein:
   while holding a connection made by using the multifunctional electronic device as a telephone terminal, the information processing means carries out control such that each of the first camera and the second camera serves as a camera for carrying out the image capturing.

21. The multifunctional electronic device as set forth in claim 1, wherein:
   while holding a connection made by using the multifunctional electronic device as a telephone terminal, the information processing means is able to transmit, to a receiving end, an image captured by each of the first camera and the second camera.

22. The multifunctional electronic device as set forth in claim 1, wherein:
   while holding a connection made by using the multifunctional electronic device as a telephone terminal, the information processing means is able to transmit, to a receiving end, a composite image of images respectively captured by the first camera and the second camera.

23. The multifunctional electronic device as set forth in claim 1, wherein:
   the multifunctional electronic device is brought from a mobile phone mode into a camera mode in response to operation of the shutter button, which operation is carried out when the multifunctional electronic device is in a standby state of the mobile phone mode with the cover section folded.

24. A multifunctional mobile electronic device comprising:
   a device main body that is a combination of a main body section and a cover section via a coupling section such that the main body section and the cover section can be folded,
   an inner surface of the main body section meeting an inner surface of the cover section when the electronic device is folded, the inner surface of the main body section being provided with an input key section including numeral keys,
   an inner surface of the cover section meeting the inner surface of the main body section when the electronic device is folded, the inner surface of the cover section being provided with a first display section,
   said device further comprising:
   a lens section, provided for a first camera, provided in an outer surface, which is exposed to outside when the electronic device is folded, of the cover section;
   a second display section, that serves as a finder of the first camera, provided in an outer surface, which is exposed to outside when the electronic device is folded, of the main body section; and
   a shutter button, provided for the first camera, provided in the device main body,
   information processing means, which allows the first camera to carry out image capturing when the main body section and the cover section are folded,
   when the main body section and the cover section are folded, the second display section serving as the finder of the first camera by displaying an image of a target for the first camera.

25. The multifunctional mobile electronic device as set forth in claim 24 wherein:
   the main body has a rectangular shape.

26. The multifunctional mobile electronic device as set forth in claim 25, wherein:
   the shutter button, provided for the first camera, in an oblong part of the device main body.

27. The multifunctional mobile electronic device as set forth in claim 26, wherein:
   the second display section displays at least one part of information displayed in the first display section.

28. The multifunctional mobile electronic device as set forth in claim 25, wherein:
   the second display section displays at least one part of information displayed in the first display section.

29. The multifunctional mobile electronic device as set forth in claim 24, wherein:
   the second display section displays at least one part of information displayed in the first display section.

30. The multifunctional mobile electronic device as set forth in claim 24, wherein:
   said device has a communication function.

31. The multifunctional mobile electronic device as set forth in claim 30, wherein:
   said device has a mobile phone function.

32. The multifunctional mobile electronic device as set forth in claim 30, wherein:
   the second display section displays at least identification information of a sending end that has transmitted a communication request, while the multifunctional electronic device folded.

33. The multifunctional mobile electronic device as set forth in claim 32, wherein:
   the main body section includes a microphone in its inner surface; and
   the cover section includes a speaker in its inner surface.

34. The multifunctional mobile electronic device as set forth in claim 33, wherein:
   the cover section includes a second camera in its inner surface.

35. The multifunctional mobile electronic device as set forth in claim 34, wherein:
   the main body section includes a shutter button, provided for the second camera, in the inner surface.

36. The multifunctional mobile electronic device as set forth in claim 32, wherein:
the cover section includes a second camera in its inner surface.

37. The multifunctional mobile electronic device as set forth in claim 36, wherein:
the main body section includes a shutter button, provided for the second camera, in its inner surface.

38. The multifunctional mobile electronic device as set forth in claim 36, wherein:
the first display section simultaneously displays images taken by the camera and the second camera, respectively.

39. The multifunctional mobile electronic device as set forth in claim 32, further comprising:
a shutter button, provided for a second camera, provided around the second display section.

40. The multifunctional mobile electronic device as set forth in claim 24, wherein:
the first display section displays information such that the coupling section is downward, and the second display section displays information such that the coupling section is upward.

41. The multifunctional electronic device as set forth in claim 24, wherein:
the second display section displays the image of the target in such a direction that a top of the image of the target corresponds to a top of the target.

42. An electronic device in which first and second members can be folded via a coupling section, comprising:
a first member including a first image pick-up section provided in a surface on an opposite side of an opposed surface which faces the second member when the electronic device is folded;
a second member including a first display section, which displays at least an image taken by the first image-pick up section, provided in a surface on an opposite side of an opposed surface which faces the first member when the electronic device is folded;
a second image pick-up section provided in an opposed surface of the first or second member, and
information processing means, which allows the first image pick-up section to carry out image capturing when the first member and the second member are folded, the first display section serving as the finder of the first image pick-up section by displaying an image of a target for the first image pick-up section.

43. The electronic device as set forth in claim 32, wherein:
an operation section of key-switch type is provided in an opposed surface of the first member or the second member; and
a second display section which displays at least data supplied via the operation section in the other of the opposed surfaces.

44. The electronic device as set forth in claim 43, further comprising:
a first shutter button, provided for the first image pick-up section, provided in an outer surface of the electronic device when the electronic device is folded.

45. The electronic device as set forth in claim 44, wherein:
the first shutter button is provided in a surface which is perpendicular to the opposed surface of the first member or is provided in a surface which is perpendicular to the opposed surface of the second member.

46. The electronic device as set forth in claim 44, wherein:
the first shutter button is provided in the surface on the opposite side of the opposed surface of the first member or is provided in the surface on the opposite side of the opposed surface of the second member.

47. The electronic device as set forth in claim 43, further comprising:
a second shutter button, provided for the second image pick-up section, provided in an opposed surfaces of the first or second members.

48. The electronic device as set forth in claim 32, further comprising:
a first shutter button for the first image pick-up section provided in an outer surface of the electronic device when the electronic device is folded.

49. The electronic device as set forth in claim 48, wherein:
the first shutter button is provided in a surface which is perpendicular to the opposed surface of the first member or is provided in a surface which is perpendicular to the opposed surface of the second member.

50. The electronic device as set forth in claim 48, wherein:
the first shutter button is provided in the surface on the opposite side of the opposed surface of the first member or is provided in the surface on the opposite side of the opposed surface of the second member.

51. The electronic device as set forth in claim 48, further comprising:
a second shutter button, provided for the second image pick-up section, provided in an opposed surfaces of the first or second members.

52. The electronic device as set forth in claim 42, further comprising:
a second shutter button, provided for the second image pick-up section, provided in an opposed surfaces of the first or second members.

53. The electronic device as set forth in claim 42, wherein:
said device has a communication function.

54. The electronic device as set forth in claim 53, wherein:
said device has a mobile phone function.

55. The electronic device as set forth in claim 42, wherein:
the first display section displays the image of the target in such a direction that a top of the image of the target corresponds to the top of the target.

56. The electronic device as set forth in claim 42, wherein:
while holding a connection made by using the electronic device as a telephone terminal, the information processing means carries out control such that the second image pick-up section serves as a camera for carrying out the image capturing.

57. The electronic device as set forth in claim 42, wherein:
while holding a connection made by using the electronic device as a telephone terminal, the information processing means is able to transmit, to a receiving end, an image captured by the second image pick-up section.

58. The electronic device as set forth in claim 42, wherein:
while holding a connection made by using the electronic device as a telephone terminal, the information processing means carries out control such that the first image pick-up section serves as a camera for carrying out the image capturing.

59. The electronic device as set forth in claim 42, wherein:
while holding a connection made by using the electronic device as a telephone terminal, the information processing means is able to transmit, to a receiving end, an image captured by each of the first image pick-up section and the second image pick-up section.

60. The electronic device as set forth in claim 42, wherein:
while holding a connection made by using the electronic device as a telephone terminal, the information processing means carries out control such that each of the first image pick-up section and the second image pick-up section serves as a camera for carrying out the image capturing.

61. The electronic device as set forth in claim 42, wherein:
while holding a connection made by using the electronic device as a telephone terminal, the information processing means is able to transmit, to a receiving end, an image captured by each of the first image pick-up section and the second image pick-up section.

62. The electronic device as set forth in claim 42, wherein:
while holding a connection made by using the electronic device as a telephone terminal, the information processing means is able to transmit, to a receiving end, a composite image of images respectively captured by the first image pick-up section and the second image pick-up section.

63. The electronic device as set forth in claim 42, wherein:
the electronic device is brought from a mobile phone mode into a camera mode in response to operation of a first shutter button that is provided for the first image pick-up section and that is provided in a surface exposed to outside when the second member is folded, which operation is carried out when the electronic device is in a standby state of the mobile phone mode with the second member folded.

* * * * *